Patented Dec. 5, 1950

2,532,583

UNITED STATES PATENT OFFICE 2,532,583

SILICON-CONTAINING POLYMER PREPARATION

Leo Walter Tyran, Niagara Falls, N. Y., assignor to E. I. du Pont de Nemours & Company, Wilmington, Del., a corporation of Delaware No Drawing. Application July 24, 1945,
Serial No. 606,875

2 Claims. (Cl. 260—80)

This invention relates to polymer preparation, and more particularly, it relates to the production of polymers obtained by the polymerization of polymerizable unsaturated alkyl silicon halides, unsaturated alkyl siliconic esters or a mixture of such halides or esters with a polymerizable non-silicon-containing vinyl compound.

Silicone resins have become important industrial materials, filling a need for polymers of high temperature stability. These resins contain molecules based upon a structural backbone of silicon and oxygen rather than upon the carbon atoms of the conventional vinyl and butadiene type of polymer. It is the silicon content of these substances that provides high temperature stability, and the same factor is responsible for the low solubility of these polymers in common solvents. It has long been desired to have polymers which will combine the high heat stability of the above-mentioned silicone resins with a comparatively high solubility in common solvents. It has also been desired to obtain polymers which will have a relatively high heat stability combined with the high tensile characteristics and rubbery properties of ordinary polymers based on carbon chain structures.

It is an object of this invention to produce polymer products having a higher heat stability than carbon chain vinyl polymers, a higher solubility in common organic solvents than silicone resins, and a higher tensile strength and rubbery character than silicone resins.

It is another object of this invention to produce polymers having several of the desirable properties of silicone resins and carbon chain vinyl resins without some of the undesirable properties of these materials.

Other objects of the invention will appear hereinafter.

These objects may be accomplished, in general, by polymerizing unsaturated alkyl silicon halides, unsaturated alkyl siliconic esters, or such esters or halides mixed with polymerizable carbon chain vinyl compounds.

It has now been discovered that unsaturated alkyl silicon halides and unsaturated alkyl siliconic esters, with or without polymerizable carbon chain vinyl compounds, can be polymerized by heating the same to a temperature between 50° C. and the boiling point thereof in the presence of a polymerization catalyst. Preferably the polymerizable substance or substances are heated while excluding air therefrom, for example, under refluxing conditions or under an atmosphere of nitrogen. It is also preferred to heat the materials for a period of at least twelve hours to obtain a suitable yield of the polymer. The resulting polymer may be isolated in any desired manner, for example by evaporating to dryness the liquid left in the polymer.

Unsaturated alkyl halides and unsaturated alkyl siliconic esters, employed in accordance with this invention, for the production of new polymers and copolymers, are generally known compounds. These compounds may be generally represented by the formula:

in which R is an unsaturated alkyl group, $R_1$ is a halogen or an alkoxy constituent and $R_2$ and $R_3$ are halogen or a monovalent organic radical, i. e., alkyl, aryl, alkaryl, aralkyl, alkoxy, aroxyalkyl, alkoxyaryl, etc. As examples of unsaturated alkyl halides and siliconic esters, the following are representative:

Monovinyl silicon trihalide
Divinyl silicon dihalide
Trivinyl silicon monohalide
Allyl silicon halides
Diallyl silicon dichloride
Monovinyl, monoallyl silicon dihalide
Monovinyl, monomethyl silicon dihalide
Monovinyl trimethoxy silane
Monoallyl trimethoxy silane
Monoallyl triethoxy silane
Monovinyl triphenyl silane
Monobutadienyl silicon trihalide
Monocrotyl silicon trihalide Diallyl silicon dichloride, $(CH_2=CHCH_2)_2SiCl_2$, and method for producing same is disclosed in Hanford patent application Serial No. 339,178, filed June 6, 1940, now Patent No. 2,386,793, and monoallyl triethoxy silane,

is disclosed in an article by Andrianov and Kamenskaya in J. Gen. Chem. (U. S. S. R.) 8 969 (1938). Chem. Abstracts 33 1266 (1939). Monovinyl silicon trihalide, B. P. 86° C.–88° C. at 750 mm. Hg, may be prepared by passing a vinyl halide, for example, vinyl chloride over or through finely divided elemental silicon at a temperature of 375° C. to 500° C. Other unsaturated alkyl silicon halides for use in accordance with this invention, for example, divinyl silicon dihalide, trivinyl silicon monohalide may be similarly prepared. For example, organo silicon halides containing isopropenyl, crotyl, difluorovinyl, butadienyl, or other polymerizable radicals may be prepared from their halides in the manner above described. Vinyl siliconic esters may be prepared by esterification from the corresponding vinyl silicon halide. The halide may be, for example, reacted with alcohol in a reaction medium such as benzene.

One, two or three unsaturated alkyl radicals may be present in each molecule of the organo silicon halide. If a straight chain polymer of good solubility characteristics is desired, it is preferred that a silicon halide containing only one unsaturated alkyl radical per molecule be employed. If, on the other hand, it is desired to produce a relatively insoluble form-stable polymer, or copolymer, an organo silicon halide containing two or three unsaturated alkyl radicals per molecule is preferably used.

Any catalyst, organic or inorganic, commonly used to catalyze the polymerization of unsaturated organic polymerizable monomers such as vinyl or acrylic organic polymerizable monomers, may be employed to catalyze the above-mentioned polymerization reaction. As examples of such catalysts, the following may be named: peroxygen compounds, such as, hydrogen peroxide, benzoyl peroxide, sodium peroxide, ammonium persulfate, potassium permanganate, acetic peracid, monoperphthalic acid, monopersuccinic acid, perpropionic acid, and monopermaleic acid; ultraviolet light, ozone, aluminum chloride, boron trifluoride and the like. The quantity of catalyst used to catalyze the polymerization reaction of the present invention may vary between wide limits. A trace of the catalyst is sufficient to induce polymerization to take place and quantities up to 10% or more are not harmful and do not interfere with the reaction. However, more than 4% by weight of the catalyst used will usually fail to produce materially improved results. Preferably between 0.05% and 3% of the catalyst is used in carrying out the polymerization reaction.

The polymerization or copolymerization in accordance with this invention may be carried out in aqueous emulsion, in bulk, or in solution, or in the case of unsaturated alkyl siliconic esters which hydrolyze slowly, it may be carried out in granular suspension. As above indicated, the present invention includes not only the polymerization of unsaturated alkyl halides and unsaturated alkyl siliconic esters or mixtures of them, but also includes the polymerization of mixtures of said halides and esters with polymerizable, carbon-chain, non-silicon-containing vinyl monomer, for example, vinyl acetate, vinyl chloride, vinyl cyanide, methyl methacrylate, and the like, to yield copolymers.

The polymerization products of the present invention may, if desired, be treated with substances to change the character thereof, for example, with water to produce silicol polymers which may be condensed to yield non-thermoplastic resins containing silicon-oxygen structural arrangements in addition to carbon-chain structures. Furthermore, the polymers and copolymers of this invention may be mixed with or dissolved in various organo silicon halides, and the mixture then hydrolyzed and condensed.

The following examples are given to set forth, in detail, certain preferred methods for carrying out the present invention, it being understood that the details of the examples are not to be considered limitative of the scope of the invention.

*Example I*

0.005 to 0.01 gram of benzoyl peroxide were added to 4 grams of diallyl silicon dichloride, $(CH_2=CHCH_2)_2SiCl_2$, B. P. 162–163° C. and the resulting mixture heated to a temperature of 70° C. while passing nitrogen therethrough for a period of 64 hours. The product was then evaporated at a temperature of 120–130° C. to dryness leaving a residue of a polymeric allyl silicon chloride having a brown, transparent brittle resinous character.

*Example II*

0.005 to 0.01 gram of benzoyl peroxide were added to 3.0 grams of monovinyl silicon trichloride, $CH_2=CHSiCl_3$, B. P. 86–88° C. and the resulting mixture heated to a temperature of 70° C. while passing nitrogen therethrough for a period of 64 hours; (the nitrogen is passed through at a rate sufficient to maintain the reactants covered with a nitrogen blanket). The resulting product was then evaporated to dryness at a temperature of 80° C. leaving a residue of polymerized vinyl silicon halide having a brown to black, somewhat brittle character.

*Example III*

To a solution of 18.1 g. of diallyl silicon dichloride dissolved in 100 ml. of benzene was added 6.4 g. methanol. The mixture was heated for half an hour at incipient boiling to remove the hydrogen chloride evolved. On cooling, the solution of methyl siliconic ester was treated with calcium carbonate for several minutes to remove traces of acid. To the filtered liquid was then added 0.20 g. benzoyl peroxide. The solution was heated at reflux for 64 hours. The mixture was then evaporated to dryness with strong heating (120–130° C.) in a current of dry air for several hours. The residue was a shiny, tan brittle resin and analysis indicated it to be a polymerized allyl methyl siliconic ester.

*Example IV*

To a solution of 8.1 g. of monovinyl silicon trichloride in 50 ml. benzene was added 4.8 g. methanol. The mixture was heated for half an hour at incipient boiling to remove the hydrogen chloride evolved. On cooling, the solution of methyl siliconic ester was treated with calcium carbonate for several minutes to remove traces of acid. To the filtered liquid was then added 0.10 g. benzoyl peroxide. The solution was heated at reflux for 64 hours. The mixture was then evaporated to dryness with strong heating (120–130° C.) in a current of dry air for several hours. The residue was found to comprise a polymer of vinyl silicontrimethoxide, a brown-to-black brittle resin.

*Example V*

To a solution of 18 grams of monovinyl silicon trichloride in 100 ml. benzene is added 10 grams methanol. The mixture is heated for one-half hour at incipient boiling to remove the hydrogen chloride evolved. On cooling, the solution of methyl siliconic ester is treated with sufficient calcium carbonate to remove traces of acid. The solution is filtered and 0.2 gram benzoyl peroxide and 50 grams vinyl acetate added thereto. The solution is then heated to a temperature of 70° C. while nitrogen is passed therethrough for a period of 64 hours. The mixture is then evaporated to dryness at a temperature of 120-130° C. The residue is composed of a copolymer of vinyl silicon halide and vinyl acetate and has a tough resinous character.

Depending upon the particular unsaturated alkyl silicon compound employed, on the temperature of polymerization, and on the presence or absence of other polymerizable ingredients, various properties may be obtained in the polymeric products. The color may vary from white to brown or black and the resins may have considerable variation in hardness and strength, ranging from hard, brittle resins to flexible, tough and only moderately hard resins. In general, the products of this invention are characterized by high softening point temperatures and insolubility in water. The polymers and copolymers obtained in accordance with this invention are soluble in benzene and other common organic solvents.

The silicon-containing polymers and copolymers of this invention have many uses suggested by their high temperature stability. Applications may be found, for example, as electrical insulation material, fabrication of motor gaskets and the like. In view of the solubility of the polymers of this invention in common organic solvents they may largely be used in the production of films, tubes, coatings, filaments and moldings.

Throughout the specification and claims reference to silicon halides is, of course, meant to include bromides, iodides and fluorides although the chlorides, in view of their cheapness are greatly to be preferred. Reference in the specification and claims to parts, proportions and percentages, unless otherwise specified refers to parts, proportions and percentages by weight.

Since it is obvious that many changes and modifications can be made in the above decribed details without departing from the nature and spirit of the invention, it is to be understood that the invention is not to be limited to said details, except as set forth in the appended claims.

I claim:
1. The process for the production of a homopolymer of vinyl silicon trichloride which comprises homopolymerizing by heating said halide to a temperature betweeen 50° C. and the boiling point thereof in the presence of a polymerization catalyst.
2. A resinous homopolymer of vinyl silicon trichloride.

LEO WALTER TYRAN.

REFERENCES CITED

The following references are of record in the file of this patent:

UNITED STATES PATENTS

| Number | Name | Date |
| --- | --- | --- |
| 2,377,689 | Hyde | June 5, 1945 |
| 2,386,793 | Hanford | Oct. 16, 1945 |
| 2,394,642 | Strain | Feb. 12, 1946 |
| 2,396,692 | Garner | Mar. 19, 1946 |
| 2,420,912 | Hurd | May 20, 1947 |
| 2,426,121 | Rust | Aug. 19, 1947 |
| 2,436,304 | Johannson | Feb. 17, 1948 |
| 2,443,740 | Kropa | June 22, 1948 |

OTHER REFERENCES

Carothers, Collected Papers, Interscience, 1940, pp. 85, 115, 119.

Hurd: Journal Amer. Chem. Soc., Oct. 1945, vol. 67, pages 1813 and 1814.

Andrianov: J. Gen. Chem. U. S. S. R., vol. 8, No. 10, pages 969-971, 1938. Translation available in Div. 50 is vol. 4 of Organosilicon Literature by Dow-Corning Corp.

Fieser et al.: Organic Chemistry, Heath, 1944, page 154.